UNITED STATES PATENT OFFICE.

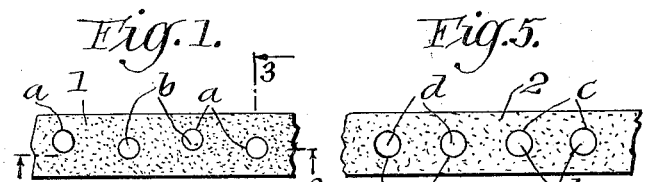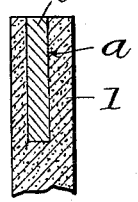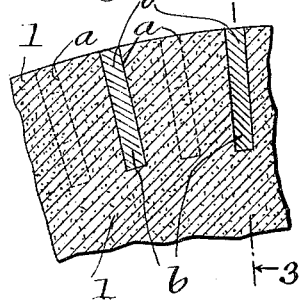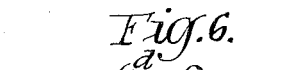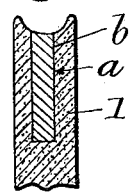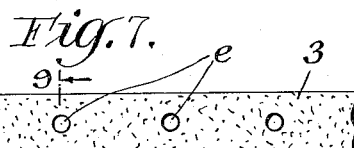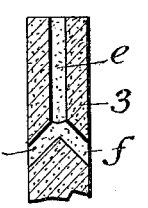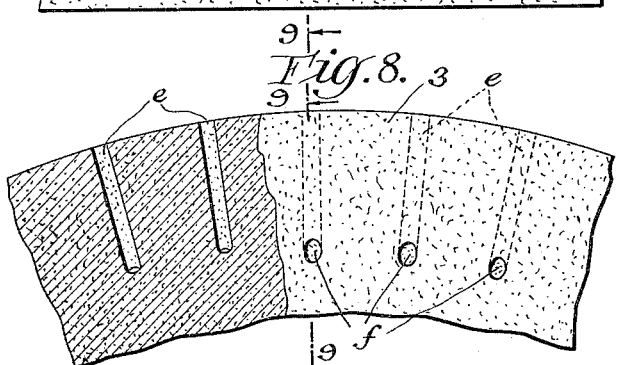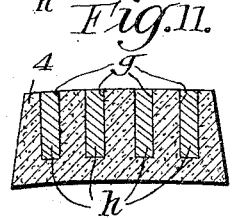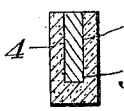

WILLARD F. MEYERS, OF LONG ISLAND CITY, NEW YORK.

STONE-SAW.

1,163,356.  Specification of Letters Patent.  Patented Dec. 7, 1915.

Application filed March 20, 1915. Serial No. 15,840.

*To all whom it may concern:*

Be it known that I, WILLARD F. MEYERS, a citizen of the United States, residing at Long Island City, in the county of Queens and State of New York, have invented certain new and useful Improvements in Stone-Saws, of which the following is a specification, reference being had therein to the accompanying drawings, forming part thereof.

My invention relates to stone saws of the type in which abrasive material, such as carborundum, for example, is employed to form the cutting edge or cutting face of the saw. Heretofore much trouble has been encountered in sawing stone with carborundum or other abrasive material, due to the fact that the abrasive cutting edges or cutting faces wear off more at the corners or margins than along the middle, so that the cutting faces soon become rounded, with the result in use that these rounded corners chip or break the corners of the stone, particularly where the moving saw leaves the kerf.

My invention has for its prime object not only to overcome this difficulty and to cause the abrasive cutting edges or working faces to wear away substantially equally in their middle and marginal portions so as to present a substantially straight transverse surface with comparatively sharp corners, but to cause the cutting faces to wear to a transversely hollow or longitudinally grooved contour presenting marginal longitudinal ridges, when so desired, as a further preventive of chipping the corners of the stone.

More particular objects and advantages of my invention will hereinafter appear.

My invention includes providing a cutting face of abrasive material having a longitudinal series of wear-producing or wear-providing breaks or gaps in the abrasive material along the middle of the cutting face, more particularly, these breaks or gaps being provided by a series of holes, for causing the abrasive material at the middle transversely of the cutting face to wear away as fast or faster than the corners or margins, and preferably these wear-producing holes contain strengthening cores of soft material.

My invention also includes features of construction and combinations of parts, as will appear from the following description.

I shall now describe the embodiments of my invention illustrated in the accompanying drawings and shall thereafter point out my invention in claims.

Figure 1 is a plan of the upper part of a circular rotary abrasive saw embodying my invention. Fig. 2 is a longitudinal vertical section of the same on a plane indicated by the line 2—2 of Fig. 1 as viewed from below. Fig. 3 is a transverse vertical section of the same on a plane indicated by the line 3—3 of Figs. 1 and 2 as viewed from the right. Fig. 4 is a similar view after use and wear. Fig. 5 is a plan similar to Fig. 1 of a modified embodiment of my invention as compared with that illustrated in the preceding figures. Fig. 6 is a longitudinal central vertical section of what appears in Fig. 5. Fig. 7 is a plan similar to Figs. 1 and 2 of a further modified embodiment of my invention. Fig. 8 is a side elevation of the same, partly in central vertical section. Fig. 9 is a vertical section of the same on a plane indicated by the line 9—9 of Figs. 7 and 8. Fig. 10 is a plan or view looking toward the cutting face of an abrasive saw tooth adapted to be mounted on a metallic saw blade and embodying my invention. Fig. 11 is a vertical central longitudinal section of the saw tooth of Fig. 10. Fig. 12 is a vertical transverse section of the same through one of the wear-producing holes. Fig. 13 is a view similar to Fig. 4 and illustrates how abrasive stone saws as heretofore commonly constructed wear to an objectionably rounded contour at the cutting face.

My invention is equally applicable to stone saws formed of abrasive material and to those having a metal blade carrying abrasive teeth.

In Figs. 1, 2, 3 and 4 of the drawings, my invention is shown as embodied in a circular rotary stone saw 1 formed of a wheel of abrasive material, such as carborundum, provided originally with a transversely straight cutting face having sharp square corners, as appears in Figs. 1, 2 and 3. A longitudinal series of wear-producing holes *a* is provided in the abrasive material along the middle of the abrasive cutting face. The wear producing holes *a* are shown as arranged radially of the saw 1 or perpendicular to its cutting face, and are of uniform size and equidistantly spaced along the middle of the cutting face.

The wear-producing holes *a* are arranged in staggered or zig-zag relation and contain soft strengthening cores or plugs *b* of soft material. These strengthening cores $b$ may be composed of any suitable material, such as carbon of a suitable degree of softness, hard rubber (vulcanite), sticks of baked shellac or other binder, or a suitable metal, for example, aluminum. The cores $b$ are molded into the abrasive material of the saw 1 and the bond or binder of the abrasive material becomes amalgamated with or firmly adheres to the cores so that the cores are firmly attached to the surrounding abrasive material and serve to prevent any substantial impairment of the strength of the wheel by reason of the wear-holes $a$, but these strengthening cores being soft offer only a slight resistance to wear and serve in this respect similarly to the wear-holes $a$ alone with the cores $b$. The staggered arrangement of the wear-producing holes $a$ is also for the purpose of maintaining the strength of the saw, and provides for obtaining a wide middle groove in the cutting face, with resulting thin or sharp marginal ridges by means of holes of smaller diameter than would otherwise be required for similar results.

The abrasive saw 1 is of homogeneous composition, so that its cutting face is of like hardness throughout. The presence of the wear-producing holes $a$, containing the soft cores $b$, increases the wear of use on the middle portion of the cutting face over what it would be without these core-containing holes. There are two reasons for this. First, the reduction in quantity of the harder abrasive material along the middle of the cutting face produced by the holes $a$ and its replacement by the much softer material of the cores $b$; and second, the edges or corners presented by these holes at the junction of the harder and softer materials facilitate wear.

The wear-producing holes $a$, containing the strengthening but readily wearable soft cores $b$, are of a size and so arranged in staggered relation and spaced apart that the increased wear produced by these holes will cause the middle of the cutting face to wear away faster than the corners or lateral margins, so that after a comparatively short period of use, the wear will produce a cutting face having thin lateral cutting edges and a middle groove of U-shape, as appears in Fig. 4. It has been found that a cutting face of this groove form produces much less chipping of the corners of the stone than does the usual transversely straight cutting face, which when it becomes rounded at the corners by use, as indicated in Fig. 13, causes even worse chipping of the stone. With a grooved cutting face, such as appears in Fig. 4, the sharp side edges or ridges of abrasive material cut the stone in advance of the cutting done by the middle groove portion, these thin ridges causing very little chipping or breaking away of the stone outward from the kerf, and any chips or broken off pieces will be quite small, and the subsequent breaking away of the projecting middle tongue of stone left by the groove of the cutting face can do no harm as the edges or corners of the stone at the kerf are protected by the narrow lateral grooves of the kerf cut in advance by the thin projecting lateral ridges of the cutting face. After the cutting face has become thus grooved to a certain depth, further deeper grooving will not take place, because of the fact that a balanced condition of wear will have been reached, for example, as shown in Fig. 4.

The grooving of the cutting face along the middle will be more or less pronounced according to the size of the wear-producing holes $a$ and their distance apart. If the holes $a$ are larger, the grooving of the cutting face will be more or deeper, and if smaller, it will be less or shallower, so that the desired extent of such grooving, according to the particular requirements, may be determined and controlled.

In the modified embodiment of my invention illustrated in Figs. 5 and 6, wear-producing holes $c$ with contained soft strengthening cores $d$ are provided along the middle line of the cutting face of a circular rotary abrasive stone saw 2. The wear-producing holes $c$ and their cores $d$ are of slightly larger diameter than the corresponding holes $a$ and cores $b$ of the first described construction and are all arranged with their axes in the same plane at the middle of the cutting face instead of in staggered relation. The cutting face with the wear of use will assume substantially the conformation illustrated in Fig. 4 and hereinbefore described.

By employing smaller wear-producing holes of the proper size and spacing them farther apart the proper distance, for example, such as the smaller and more widely spaced wear-producing holes $e$ shown along the middle line of the cutting face in the circular rotary abrasive stone saw 3 illustrated in Figs. 7, 8 and 9 of the drawings, the abrasive cutting face may be caused to wear away evenly so as to preserve its original transversely straight condition, substantially as appears in Fig. 9, as in some instances might be desirable. Because of the fact that the wear-producing holes $e$ are small and widely spaced, the abrasive saw 3 will not be appreciably weakened by these holes and the strengthening cores such as hereinbefore described are omitted leaving the wear-producing holes $e$ open.

Centrifugal force will tend to keep the open wear-producing holes $e$ free from cuttings, but as an assistance in this respect, counterbores $f$ are provided which communicate with the wear-producing holes e at the sides, and these counterbores f are shown as inclined outwardly and entering the holes e at the bottoms of the latter. The usual liquid, such as water, employed in sawing stone will flow in at the counterbores f and out through the radial wear-producing holes e, by reason of centrifugal force, and will assist in keeping the holes e open.

In manufacturing the abrasive stone saw of my invention, the open wear-producing holes, such as e, and also the counterbores f may be readily drilled by means of a diamond drill. As another method of manufacture for open wear-producing holes, soft cores corresponding to the several holes may be molded into the abrasive material of the saw, as hereinbefore described, and then these soft cores removed by drilling them out. Or in case metal cores are employed, they could be pulled out if desired. Should such soft cores be left in the holes, my invention would be carried out as hereinbefore described.

It is to be understood that the wear-producing holes, either with or without the soft strengthening cores, may be of any depth desired, according to the depth to which the abrasive material is to be worn away by use, and in the case of a rotary saw some of the holes may be of less depth than the others so as to compensate for the decreasing circumstance as the center of the circular saw wheel is approached.

In Figs. 10, 11 and 12 I have shown the application of my invention to separate abrasive saw teeth adapted to be mounted on a metal saw blade in any suitable way, as is well understood in the art. The tooth 4 is formed of suitable abrasive material of homogeneous composition throughout, for example, carborundum, and is shown as provided on its transversely straight cutting face with a longitudinal row or series of wear-producing holes g shown as extending perpendicular to the cutting face nearly but not quite through to the base of the tooth and containing soft readily wearable reinforcing or strengthening plugs or cores h. The operation is substantially the same as hereinbefore described in reference to the wear-producing holes a, c and e.

It is obvious that various modifications may be made in the constructions shown in the drawings and above particularly described within the principle and scope of my invention.

I claim:

1. A stone saw having abrasive material providing a cutting face and having wear-producing holes in such material along the middle portion of the cutting face, the marginal portions of the cutting face being continuous and free from such holes, so that the wear of use along the middle of the cutting face will be increased so as to leave projecting marginal cutting ridges.

2. A stone saw having abrasive material providing a cutting face and having a longitudinal series of staggered wear-producing holes along the middle only of the cutting face, for causing increased wear of use at the middle of the cutting face so as to leave projecting marginal cutting ridges.

3. A stone saw having abrasive material providing a cutting face and having a longitudinal series of wear-producing holes of uniform size equidistantly spaced along the middle only of the cutting face.

4. A stone saw having homogeneous abrasive material providing a cutting face and having a longitudinal series of wear-producing holes of uniform size equidistantly spaced along the middle only of the cutting face and arranged perpendicular to the length of the cutting face.

5. A stone saw having abrasive material providing a cutting face and having a longitudinal series of wear-producing holes in the middle portion only of the cutting face, and strengthening cores of soft material contained in the wear-producing holes and having firm attachment to the surrounding abrasive material.

6. A stone saw having abrasive material providing a cutting face and having a longitudinal series of wear-producing holes in the middle portion only of the cutting face, the size of these wear-producing holes and the distance between them being such as to produce a predetermined amount of increased wear along the middle of the cutting face.

In testimony whereof I have affixed my signature in presence of two witnesses.

WILLARD F. MEYERS.

Witnesses:
WM. ASHLEY KELLY,
HARRY C. LEWIS.